Patented Nov. 13, 1951

2,574,554

UNITED STATES PATENT OFFICE 2,574,554

BIS CARBONYL DITHIOPHOSPHATE COMPOUNDS

Arthur H. Fischer, New York, N. Y., assignor to Minerec Corporation, New York, N. Y.

No Drawing. Original application June 26, 1946, Serial No. 679,566. Divided and this application May 9, 1947, Serial No. 747,143

3 Claims. (Cl. 260—455)

This invention relates to the production of new organic compounds and has for an object the provision of new dicarbonyl compounds. More specifically, the invention contemplates the provision of dicarbonyl compounds comprising organic dithio acid radicals and dicarbonyl compounds in which the carbonyl groups are joined together by means of multivalent organic radicals. The invention further contemplates the provision of dicarbonyl compounds comprising xanthate radicals and dithiophosphate radicals. Compounds of the invention include dicarbonyl compounds in which the carbonyl groups are joined together by glycol radicals such, for example, as O—$C_2H_4$—O and

O—$C_2H_4$—O—$C_2H_4$—O compounds such for example, as derivatives of ethylene glycol and diethylene glycol.

A dicarbonyl compound comprising a xanthate radical may be produced, for example, by reacting a salt or an acid comprising a xanthate radical with a dihaloformate to form a product having the following structural formula:

in which Y is a multivalent organic radical such, for example, as a glycol radical, and R′ and R″ are organic radicals such, for example, as ethyl radicals.

A dicarbonyl compound comprising a dithiophosphate radical may be produced, for example, by reacting a salt or an acid comprising an organic dithiophosphate radical with a dihaloformate to form a product having the following structural formula:

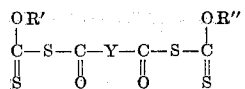

in which Y is a multivalent organic radical such, for example, as a glycol radical, and R′, R″, R‴ and R⁗ are organic radicals such, for example, as ethyl radicals.

When substitution products of organic dithio acids containing organic radicals are employed, bis carbonyl dithio compounds containing corresponding organic radicals will be produced. Substitution products of acids and salts containing alkyl radicals or aryl radicals or both may be employed, and, in the above formulae, R′, R″, R‴ and R⁗ represent such radicals.

The use of di-substituted organic compounds comprising dithiophosphate radicals results in the production of tetra-substituted compounds.

The use of di-substituted esters, for example, results in the production of tetra esters of bis carbonyl dithiophosphate compounds.

The use of xanthates results in the production of bis carbonyl xanthate compounds containing the organic radicals or groups present in the reagents employed.

In producing compounds in accordance with the invention, substitution products of acids and salts cointaining alkyl radicals or aryl radicals or both may be employed.

The compounds of the invention are suitable for various uses, and they may be employed with particular advantage as mineral collecting agents in the concentration of minerals by froth flotation.

Among the compounds found most suitable for use in fluotation concentration processes are

COMPOUND A

A reaction product of sodium ethyl xanthate and ethylene glycol chloroformate having the following structural formula:

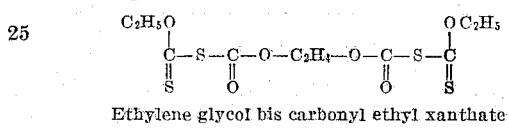

Ethylene glycol bis carbonyl ethyl xanthate

COMPOUND B

A reaction product of sodium ethyl xanthate and diethylene glycol chloroformate having the following structural formula:

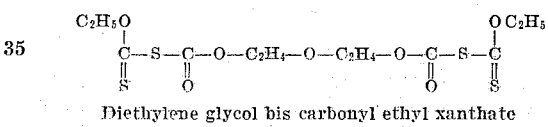

Diethylene glycol bis carbonyl ethyl xanthate

COMPOUND C

A reaction product of sodium diethyl dithiophosphate and diethylene glycol chloroformate having the following structural formula:

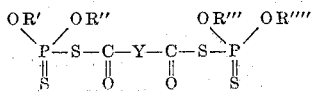

Diethylene glycol bis carbonyl diethyl dithiophosphate

COMPOUND D

A reaction product of sodium butyl xanthate and diethylene glycol chloroformate having the following structural formula:

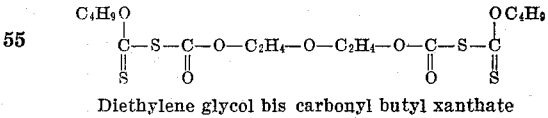

Diethylene glycol bis carbonyl butyl xanthate

The use of the compounds of the invention for the concentration of minerals is described and claimed in my copending application Serial No. 679,565, filed June 26, 1946, now Patent No. 2,501,269.

The following examples illustrate methods of preparing compounds in accordance with my invention suitable for use in the flotation methods or processes of my invention:

Example I

Preparation of the reaction product of sodium ethyl xanthate and diethylene glycol chloroformate.

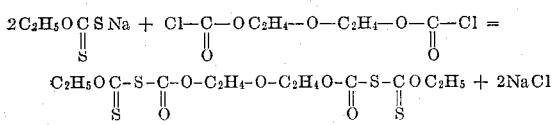

300 grams of pure sodium ethyl xanthate.2H$_2$O (13% in excess of theory) were dissolved in 1 liter of water in a 2 liter flask provided with stirrer and thermometer. 170.4 grams of diethylene glycol chloroformate were added to this solution over a period of fifteen minutes. The temperature of the reaction mixture rose slowly to 30 °C. The mixture was heated to 45° C. The heating was then discontinued and the temperature slowly fell to that of the room. The total time of reaction was five hours.

The oily product was separated and the aqueous layer extracted with carbon bisulfide.

The oily product and the carbon bisulfide extracts were combined and the carbon bisulfide was distilled off in vacuo.

The product was a yellow oil. The yield was 241 grams which is 81.17% of the theoretical amount for the above equation.

Analysis: Per cent
Sulfur calculated _____ 31.86
Sulfur found _____ 31.41

Example II

Preparation of the reaction product of sodium diethyl dithiophosphate and ethylene glycol chloroformate:

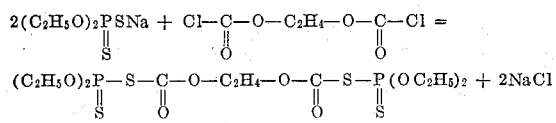

153.1 grams of 95% diethyl dithiophosphoric acid were dissolved in 500 ml. of dry acetone and converted to the sodium salt by neutralization with 44.7 grams of anhydrous sodium carbonate (108% of theory) which was added slowly. This mixture, contained in a 1 liter flask provided with a stirrer and thermometer, was stirred for fifteen minutes after the addition of the sodium carbonate, to complete the neutralization. 73 grams of ethylene glycol chloroformate were then added in 20 minutes, the temperature was kept below 25° C. by means of a cooling bath, and the stirring was continued for two hours after the ethylene glycol chloroformate had been added.

The reaction mixture was diluted with water and the water insoluble oily reaction product was separated and dried by warming to 50° C. in vacuo.

191 grams of product were obtained which is a theoretical yield.

Analysis: Per cent
Sulfur calculated _____ 26.36
Sulfur found _____ 26.35

Dicarbonyl compounds containing other organic radicals may be produced by the same procedure or by similar procedures when employing organic reagents containing such other organic radicals.

This application is a division of my application Serial No. 679,566, filed June 26, 1946, wherein I have claimed the xanthate compounds described herein.

I claim:

1. A compound having the structural formula:

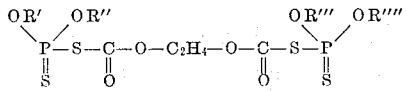

in which R', R'', R''' and R'''' are ethyl radicals.

2. A compound having the structural formula:

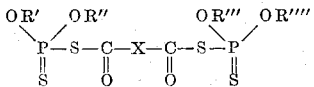

in which R', R'', R''' and R'''' are ethyl radicals and X is a residue from an ethylene glycol having a formula from the group —O—C$_2$H$_4$—O— and —O—C$_2$H$_4$—O—C$_2$H$_4$—O—.

3. A compound having the structural formula:

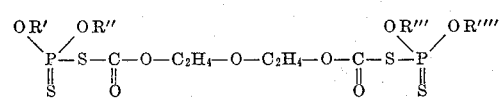

in which R', R'', R''' and R'''' are ethyl radicals.

ARTHUR H. FISCHER.

REFERENCES CITED

The following references are of record in the file of this patent:

UNITED STATES PATENTS

| Number | Name | Date |
| --- | --- | --- |
| 1,949,629 | Romieux et al. | Mar. 6, 1934 |
| 2,434,357 | Fischer | Jan. 13, 1948 |